United States Patent [19]
Beck

[11] Patent Number: 5,174,032
[45] Date of Patent: Dec. 29, 1992

[54] UNIVERSAL WHEEL GAUGE

[76] Inventor: George W. Beck, 340 SE. 3rd Ave., Woodhull, Ill. 61490

[21] Appl. No.: 787,379

[22] Filed: Nov. 4, 1991

[51] Int. Cl.⁵ .................. G01B 5/00; G01D 21/00
[52] U.S. Cl. ................................ 33/203; 33/203.18
[58] Field of Search .............. 33/203, 203.18, 600

[56] References Cited

U.S. PATENT DOCUMENTS

| | | | |
|---|---|---|---|
| 154,457 | 8/1874 | Collins | 33/203 |
| 3,552,700 | 1/1971 | Mitchell | 33/203.18 |
| 4,011,659 | 3/1977 | Horvallius | 33/203.18 |
| 4,129,950 | 12/1978 | Weinhaus et al. | 33/600 |
| 4,432,145 | 2/1984 | Caroff | 33/203.18 |
| 4,730,399 | 3/1988 | Campbell | 33/203 |
| 4,918,821 | 4/1990 | Bjork | 33/203.18 |
| 5,074,048 | 12/1991 | Yokomizo et al. | 33/203.18 |

FOREIGN PATENT DOCUMENTS

| | | | |
|---|---|---|---|
| 3608424 | 9/1987 | Fed. Rep. of Germany | 33/203.18 |
| 0499290 | 2/1920 | France | 33/600 |
| 748884 | 7/1933 | France | 33/203 |

Primary Examiner—Thomas B. Will
Attorney, Agent, or Firm—Lyon & Lyon

[57] ABSTRACT

A gauge for measuring the spacing and configuration of the lug holes of vehicle wheels. A portable plate having a series of slots containing movable wing nut bolts for measuring and recording the spacing and configuration of lug holes is disclosed.

6 Claims, 1 Drawing Sheet

UNIVERSAL WHEEL GAUGE

BACKGROUND OF THE INVENTION

The field of the present invention is the measurement of vehicle wheels.

The wheels of a vehicle, such as an automobile, truck or boat, are conventionally connected to the axle of the vehicle by threading the lugs of the hub of the axle through corresponding lug holes in the wheel. The lugs are tightened into position and held by bolts. A wheel is thus removed by loosening and removing the bolts and sliding the wheel off the hub. Vehicle owners, mechanics, repairmen, auto rebuilders and restorers and hobbyists often have an interest in replacing the wheels of a vehicle, for performance, repair, aesthetic or other reasons. Finding a replacement wheel with a lug hole pattern which matches the lug pattern of the vehicle's hub, however, is a known problem.

Wheel assemblies usually contain four or five lugs on the axle hub and four or five corresponding lug holes on the wheel. However, among all assemblies, there exist numerous different lug patterns and arrangements, varying in dimension, spacing and pattern. Sometimes even two cars of the same model, year and make will sport different lug patterns in their wheel assemblies. Such lug pattern variations make it difficult for one to determine whether a desired replacement wheel will fit the particular lug pattern of a vehicle. In order to determine the fit, one must bring the wheel to the vehicle, or the vehicle to the wheel, and "try it on." The inconveniences of this method are apparent. One cannot easily shop around for a wheel in this manner, and it requires repeated wheel removal and replacement.

Despite such variation among the lug patterns of wheel assemblies, little has been done to standardize patterns or to provide a means for finding a wheel which will match the lug pattern of a particular vehicle.

SUMMARY OF THE INVENTION

The present invention is directed to a device for measuring the size and dimensions of the lug pattern of a wheel assembly, and for fixing those measurements in a compact, portable device which can be easily stored, such as in a glove compartment or tool box, or carried about while searching for an appropriate wheel and which is fitted against the lug hole pattern of a desired replacement wheel to determine whether such a wheel matches the lug pattern of the vehicle.

To this end, a plate, in the form of a flat disc with finger-like openings is associated with moveable bolts to determine and fix a lug hole pattern of a wheel.

Accordingly, it is an object of the invention to provide a measuring gauge for vehicle wheels. Other and further objects and advantages of the invention will appear hereinafter.

DETAILED DESCRIPTION OF THE PREFERRED EMBODIMENT

Figure 1:
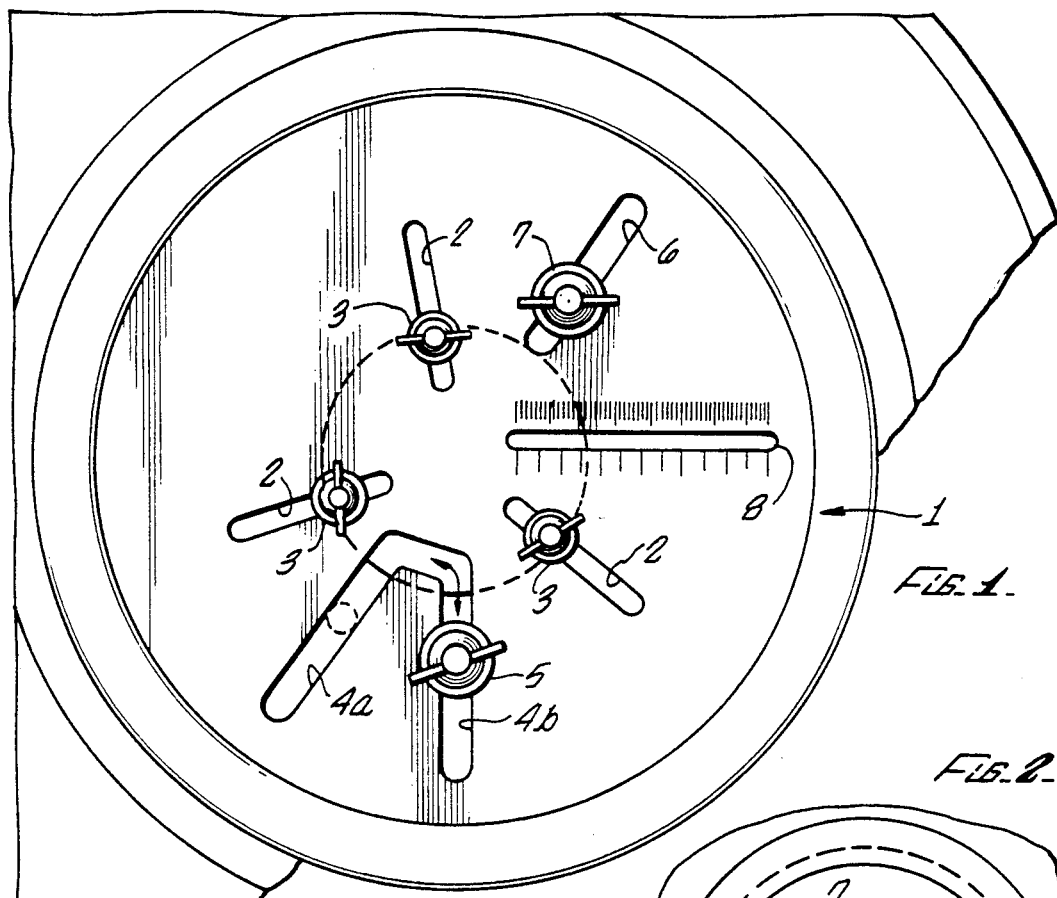
FIG. 1 is a schematic plan view of the front side of the invention as employed on a vehicle wheel.
Figure 2:
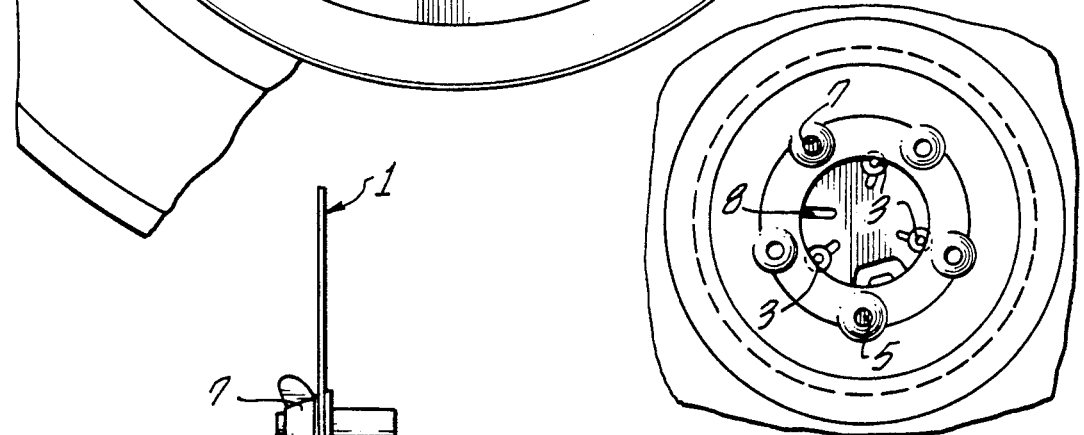
FIG. 2 is a schematic plan view of the back side of the invention as employed on a vehicle wheel.

Turning in detail to the drawings, FIG. 1 illustrates a flat disc 1 containing six openings forming radial slots designated as 2, 4a, 4b, and 6. The disc may be made of aluminum or other metal, plastic, wood, rubber or other material. In the preferred embodiment, the disc is made of aluminum ⅛" thick for durability, rigidity, and minimal weight for ease in portability. As can be seen in FIGS. 1 and 2, the disc is of a diameter smaller than the wheel to be measured. In the preferred embodiment, it is about 8 or 9 inches in diameter.

Three openings 2, forming radial slots in the disc, as seen in FIG. 1, are finger-like and radiate out from the center of the disc. They are equidistant. In the preferred embodiment, there are three such slots, but more may be employed. The center of the disc framed by the center-directed ends of openings 2 is of a diameter smaller than the smallest center hole of a wheel, or of a corresponding axle hub. A wing-nut bolt 3 is movably engaged in each opening 2. The bolt 3 is threaded through the opening, and is tightened or loosened by a wing nut. The bolt 3 can thus move laterally along the finger-like opening 2 and can be tightened in any position therealong.

Figure 3:
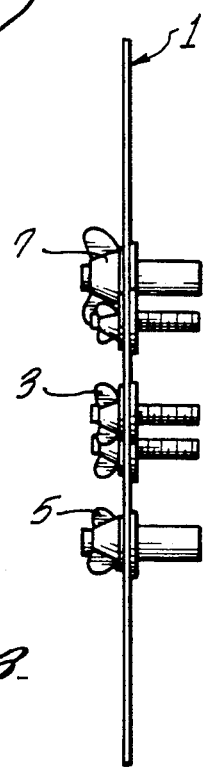
FIG. 3 is a schematic side view of the invention.
Figure 4A:
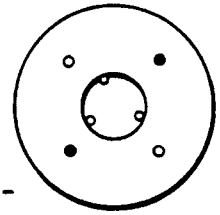
FIGS. 4A-4D is a schematic diagram of examples of different lug hole patterns in connection with which the invention can be used.
Figure 4B:
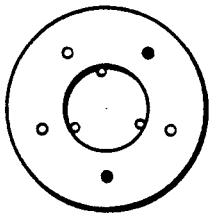
Figure 4C:
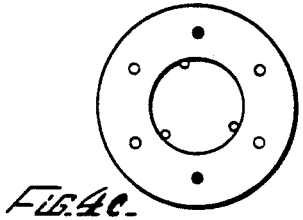
Figure 4D:
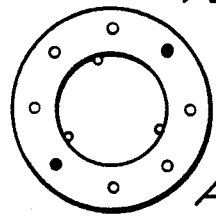

As seen in FIGS. 2 and 3, in operation, the bolts 3 are moved all the way to the center-directed end of the openings 2. The disc is then placed over a wheel. In order to center the invention, the bolts 3 are then moved along openings 2 until they are arrested by the edge of the center hole of the wheel. The bolts 3 are then tightened into place by the wing nuts, thus fixing the diameter of the center hole of the wheel.

The disc 1 in FIG. 1 contains an opening 4 forming radial slots, 4a and 4b. This opening 4 also movably engages a wing-nut bolt 5. This opening is used to measure and fix the position of a lug hole in the wheel being measured. As seen in FIGS. 2 and 3, after the disc is placed over the wheel and the center hole of the wheel is measured and fixed by means of bolts 3, the disc is rotated until slot 4a (in the case of a 4, 6 or 8 lug hole wheel), or slot 4b (in the case of a 5 lug hole wheel), of the opening aligns with one of the lug holes of the wheel. The bolt 5 of the opening is then threaded through slot 4a or 4b and through the exposed lug hole. The wing-nut of bolt 5 is then tightened to record the position of the lug hole in relation to the center of the wheel. Prong 4b of the opening, which in the preferred embodiment is positioned at a 162° angle from opening 6, is used for an odd-numbered lug hole pattern,, usually comprising five lug holes, whereas slot 4a of the opening is used for even-numbered lug hole patterns, usually comprising four, six or eight lug holes.

Opening 6 shown in FIG. 1 is a radial slot positioned on the disc 1 opposite and equidistant from slot 4a of the opening. This opening 6 also engages a wing-nut bolt 7, which is moveable along the length of opening 6. Opening 6 is used to determine and record the position of a second lug hole of the wheel—directly opposite in the case of an even-numbered lug hole pattern and offset in the case of an odd-numbered pattern—by threading bolt 7 through opening 6 and the lug hole and tightening it into place. FIGS. 4A-4D shows examples of different lug hole patterns and the positioning of bolts 5 and 7 in each pattern.

Opening 8 in FIG. 1 is a ruler for convenience in measuring.

After the bolts have been fixed into position as described above and as illustrated in the drawings, the disc 1 is then lifted from the wheel, the dimensions of the pattern having been recorded thereon. The invention can then be placed against another wheel of interest. If the lug pattern of the wheel is compatible with the pattern recorded by the invention, the wheel will fit the hub of the vehicle whose wheel was previously measured.

Thus, a measuring gauge is disclosed which measures the lug pattern of a vehicle and provides a gauge to measure lug hole patterns of vehicle wheels. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A gauge for measuring the lug hole pattern of a vehicle wheel, comprising
   a plate having a center;
   a first series of slots in said plate;
   a second series of slots in said plate; and
   a multitude of positionable markers;
   wherein said first series of slots in said plate are equiangularly positioned about the center of said plate, each having a proximal end and a distal end to said center, and each extending radially of said center;
   wherein each slot of said second series of slots in said plate has a proximal end and a distal end and extends radially of the center of said plate;
   wherein each marker of said multitude of positionable markers is movably engaged in one of said slots of said first and second series of slots in said plate; and
   wherein a first slot of said second series of slots is positioned at a 180 degree angle from a second slot of said second series of slots, and a third slot of said second series of slots is positioned at a 162 degree angle from said first slot of said second series of slots.

2. The gauge of claim 1 wherein said positionable markers are wing nut bolts.

3. The gauge of claim 1 wherein said plate is substantially circular.

4. The gauge of claim 3 wherein said plate is substantially flat.

5. The gauge of claim 1 wherein two or more of said slots in said second series of slots are connected.

6. A gauge for measuring the lug hole pattern of a vehicle wheel, comprising
   a substantially round and substantially flat plate having a center;
   a first series of three slots in said plate;
   a second series of three slots in said plate;
   a multitude of wing nut bolts;
   wherein said first series of three slots in said plate are equiangularly positioned about the center of said plate, each having a proximal end and a distal end to said center, and each extending radially of said center;
   wherein each slot of said second series of three slots in said plate has a proximal end and a distal end and extends radially of the center of said plate;
   wherein each wing nut bolt is movably engaged in one of said slots of said first and second series of slots in said plate;
   wherein a first slot of said second series of three slots is positioned at a 180 degree angle from a second slot of said second series of three slots, and a third slot of said second series of three slots is positioned at a 162 degree angle from said first slot of said second series of three slots; and
   wherein said second and third slots of said second series of three slots are connected.

* * * * *